United States Patent
Chiluvuri et al.

(10) Patent No.: US 11,023,101 B2
(45) Date of Patent: Jun. 1, 2021

(54) SYSTEM AND METHOD FOR IMPLEMENTING A SELF SERVICE MACHINE LEARNING FRAMEWORK

(71) Applicant: JPMorgan Chase Bank, N.A., New York, NY (US)

(72) Inventors: Venkata Rajam Raju Chiluvuri, Hyderabad (IN); Swarna Bhagath Irukulla, Hyderabad (IN); Sai Chaitanya Chitneedi, Hyderabad (IN); Anil Kumar Gannamani, Financial District (IN)

(73) Assignee: JPMorgan Chase Bank, N.A., New York, NY (US)

( * ) Notice: Subject to any disclaimer, the term of this patent is extended or adjusted under 35 U.S.C. 154(b) by 0 days.

(21) Appl. No.: 16/534,389

(22) Filed: Aug. 7, 2019

(65) Prior Publication Data

US 2021/0041991 A1 Feb. 11, 2021

(51) Int. Cl.
| | |
|---|---|
| *G06F 3/048* | (2013.01) |
| *G06F 3/0482* | (2013.01) |
| *G06F 3/0484* | (2013.01) |
| *G06F 16/174* | (2019.01) |
| *G06N 20/00* | (2019.01) |
| *G06K 9/62* | (2006.01) |
| *G06F 16/17* | (2019.01) |

(52) U.S. Cl.
CPC ........ *G06F 3/0482* (2013.01); *G06F 3/04847* (2013.01); *G06F 16/1727* (2019.01); *G06F 16/1748* (2019.01); *G06K 9/6256* (2013.01); *G06K 9/6262* (2013.01); *G06N 20/00* (2019.01)

(58) Field of Classification Search
CPC ............... G06F 3/0482; G06F 16/1727; G06F 16/1748; G06F 3/04847; G06N 20/00; G06K 9/6256; G06K 9/6262
USPC ........................................................ 715/769
See application file for complete search history.

(56) References Cited

U.S. PATENT DOCUMENTS

| | | | |
|---|---|---|---|
| 2016/0267396 A1* | 9/2016 | Gray | G06N 20/00 |
| 2018/0189680 A1* | 7/2018 | Gupta | G06Q 40/025 |

\* cited by examiner

*Primary Examiner* — Anil N Kumar
(74) *Attorney, Agent, or Firm* — Hunton Andrews Kurth LLP

(57) ABSTRACT

An embodiment of the present invention is directed to reducing complexities in machine learning application development by providing a drag-and-drop user interface for an entire machine learning process. The innovative system significantly reduces development time and efforts. An embodiment of the present invention is directed to applying optimized common components that follow industry wide best practices thereby improving the time to market as well as the overall code quality. The embodiments of the present invention provide adaptability and extendibility to support various platforms. According to an embodiment of the present invention, a generic platform agnostic code generator may be extended to support various use cases, applications, platforms and environments.

20 Claims, 4 Drawing Sheets

SYSTEM AND METHOD FOR IMPLEMENTING A SELF SERVICE MACHINE LEARNING FRAMEWORK

FIELD OF THE INVENTION

The invention relates generally to a system and method for implementing a self-service framework for developing machine learning applications.

BACKGROUND OF THE INVENTION

Developing a machine learning solution is an iterative and time extensive process and requires statistical expertise. Most of the time and effort spent in building a solution are spread across Data Curation, Data Preparation and Model Building. Currently existing frameworks add additional levels of complexity with run time exceptions and long periods to debug the issues in the code. Over multiple iterations, the overall code quality can take a hit and best practices may not be followed. This results in long term implications.

These and other drawbacks exist.

SUMMARY OF THE INVENTION

According to one embodiment, the invention relates to a system that implements a machine learning accelerator tool. The system comprises: an input that receives a data file from a data source via a communication network; and a computer processor, coupled to the user interface and a memory, configured to perform the steps of: initiating a build workflow to predict an event, wherein the workflow comprises a plurality of components; setting one or more parameters for each component in the workflow; sequencing, via an interactive user interface, the components in the workflow, wherein the interactive user interface comprises a Data Services component, Model Services component and a Validation Services component; executing the workflow to predict the event; and providing, via the interactive user interface, validation results.

According to another embodiment, the invention relates to a method that implements a machine learning accelerator tool. The method comprises the steps of: receiving, via an input, a data file from a data source via a communication network; initiating, via a computer processor, a build workflow to predict an event, wherein the workflow comprises a plurality of components; setting, via the computer processor, one or more parameters for each component in the workflow; sequencing, via an interactive user interface, the components in the workflow, wherein the interactive user interface comprises a Data Services component, Model Services component and a Validation Services component; executing, via the computer processor, the workflow to predict the event; and providing, via the interactive user interface, validation results.

The system may include a specially programmed computer system comprising one or more computer processors, interactive interfaces, electronic storage devices, and networks. The computer implemented system, method and medium described herein provide unique advantages to entities, organizations and other users, according to various embodiments of the invention. Existing solutions are locked into their eco-systems and cannot be used to support multiple platforms including platforms within the firm. An embodiment of the present invention is generic enough to support in-house and off-premise platforms thereby providing efficiencies and flexibility that are unavailable with current systems. With an embodiment of the present invention, substantial savings in terms of time and resources to develop a machine learning solution may be realized. An embodiment of the present invention further removes the need to hand code the solutions thereby allowing the Data Scientists and other users to focus on semantics of the solution as opposed to the syntax and implementation. The generic machine learning code generator of an embodiment of the present invention may be further extendable to support various platforms and use cases.

These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION OF THE PREFERRED EMBODIMENTS(S)

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

An embodiment of the present invention is directed to reducing complexities in machine learning application development by providing a drag-and-drop user interface for an entire machine learning process. The innovative system significantly reduces development time and efforts. An embodiment of the present invention is directed to applying optimized common components that follow industry wide best practices thereby improving the time to market as well as the overall code quality. The embodiments of the present invention provide adaptability and extendibility to support various platforms. According to an embodiment of the present invention, a generic platform agnostic code generator may be extended to support various use cases, applications, platforms and environments.

The various embodiments of the present invention may be further extended to support Deep Learning use cases and other platforms (e.g., Spark) for processing larger volumes of data.

Developing a machine learning solution may involve various phases including: determining a learning objective; getting and prepping the data; designing, building and training and deployment and implementation. Determining a learning objective may involve understanding a business problem. Getting and prepping the data may involve acquiring the data, understanding the data and then preparing the data. Designing, building and training phase may involve building the model and training the model. Deployment and implementation may involve validating and deploying the model, consuming and integrating the model and monitoring performance. A business application may then invoke the machine learning model.

Figure 1:
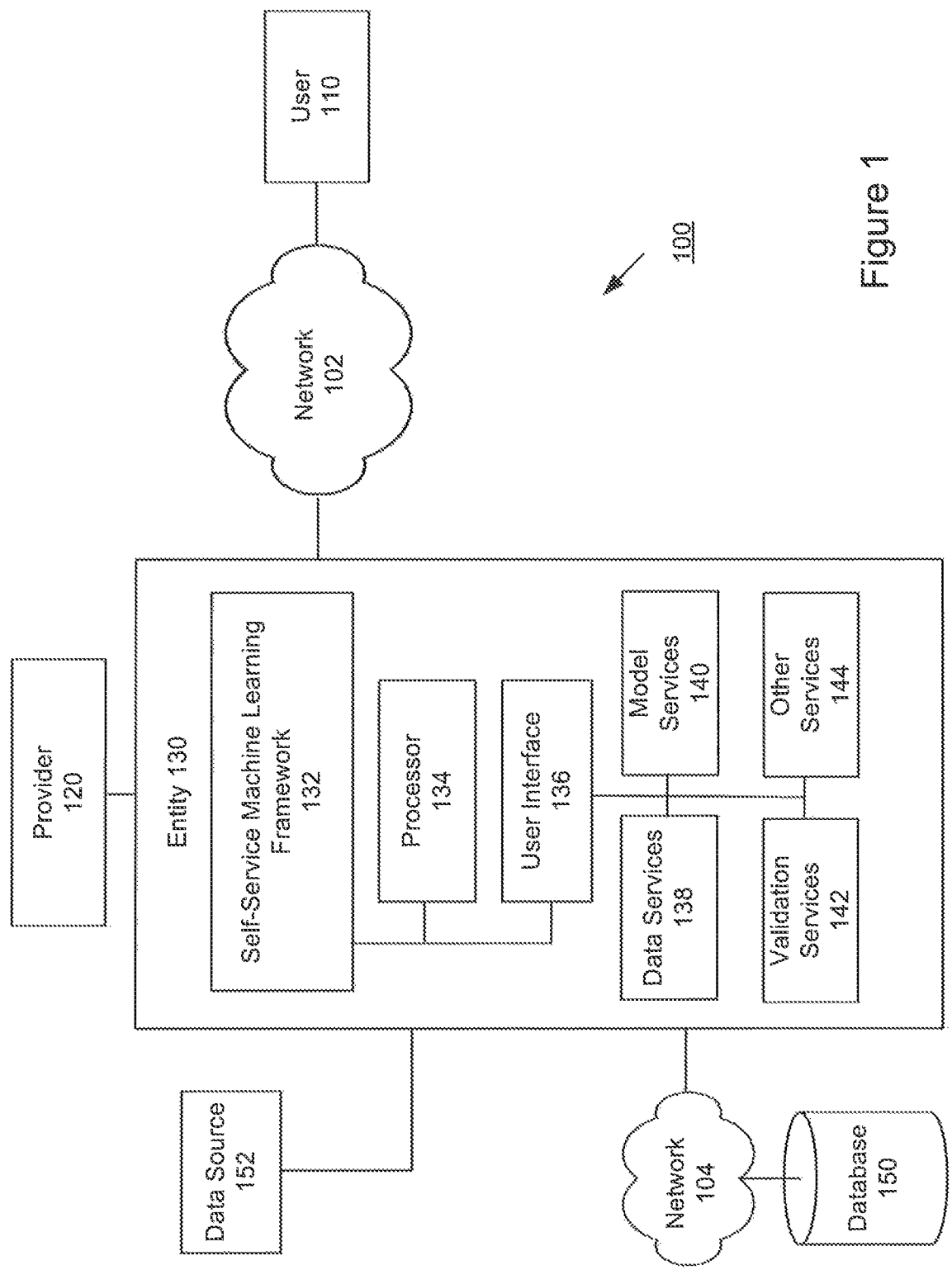
FIG. 1 illustrates a system that implements a self-service machine learning framework, according to an embodiment of the present invention.

FIG. 1 illustrates a system that implements a self-service machine learning framework, according to an embodiment of the present invention. As shown in FIG. 1, Self-Service Machine Learning Framework 132 includes processing components, modules and functions. According to an exemplary implementation, Self-Service Machine Learning Framework 132 may include Processor 134, User Interface 136 and various networking and communication components. Other functions may be supported. User Interface 136 may include services, including Data Services 138, Model Services 140, Validation Services 142 and other services represented by 144. Other services and functions may be provided. Data Services 138 may provide functions and features including File Handling, Data Cleanup, Data Transformation, and Feature Selection. File Handling may include read file and write file. Data Cleanup may include Missing Values, Detect Outliers and Remove Duplicates. Data Transformation may involve identifying outliers (e.g., other techniques using SD, mean, etc.), missing values (e.g., removing rows, etc.), perform aggregation (e.g., creating new columns, etc.), perform data functions, provide an option for new column creation, utilize unstructured data (e.g., text) and other data prep functions. Feature Selection may include low variance, analysis, regression (e.g., stepwise regression), high correlation, etc. Model Services 140 may include Model Building, which may include train test splits, logistic regressions, various types of regressors and classifiers. Regressors may include linear regressor, ridge regressor, polynomial regressor, nearest neighbor regressor, support vector regressor, kernel ridge regressor, nearest neighbor classifier, etc. Validation Services 142 may include Model Evaluation, which may include confusion matrix, classification report, area under curve, F1 score, hamming loss, precision score, recall score, mean absolute error, mean squared error, mean absolute error, explained variance score, etc.

The self-service machine learning framework of an embodiment of the present invention is directed to accelerating the various phases of a machine learning project lifecycle and thereby significantly reducing development efforts. The self-service machine learning framework may be language agnostic as well as platform agnostic. Machine Learning (ML) Engineers, Data Scientists and other users are not required to learn a specific programming language. In addition, an embodiment of the present invention may work on desktop, on premise-servers, distributed platforms as well as cloud services.

For example, User Interface 136 may display summary statistics and schema; save workflow as a user guide, connect to other applications and call data prep workflows, connect to database sources, save and load workflow, handle multiple conditions and categorical values and further create user defined functions (UDFs).

The components illustrated in FIG. 1 are merely exemplary, other devices may be represented in various applications. While a single component is illustrated, each component may represent multiple components.

Entity 130, such as a financial institution, may host a Self Service Machine Learning Framework 132. Entity 130 may support Self-Service Machine Learning Framework 132 as an integrated feature or system. According to another example, Self-Service Machine Learning Framework 132 may be offered by a third party service provider 120. Other scenarios and architectures may be implemented. Self-Service Machine Learning Framework may send and/or receive data from various other sources represented by Data Source 152. Data source 152 may be internal or external to Entity 130. Data may be stored and managed in storage components, represented by Database 150, via Network 104. Entity 130 may be communicatively coupled to Databases, represented by 150. Databases 150 may include any suitable data structure to maintain the information and allow access and retrieval of the information. The storage may be local, remote, or a combination thereof with respect to Databases 150. Communications with Databases 150 may be over a network, or communications may involve a direct connection between Databases 150 and Entity 130, as depicted in FIG. 1. Databases 150 may also represent cloud or other network based storage.

Network 102 may be communicatively coupled with various components in a network. User 110 may represent various types of users, including ML Engineers, Data Scientists, etc. For example, User 110 may communicate with the Self-Service Machine Learning Framework via Network 102 through User Interface 136. Entity 130 may communicate with various users, represented by 110, using any mobile or computing device, such as a laptop computer, a personal digital assistant, a smartphone, a smartwatch, smart glasses, other wearables or other computing devices capable of sending or receiving network signals.

The system 100 of FIG. 1 may be implemented in a variety of ways. Architecture within system 100 may be implemented as hardware components (e.g., module) within one or more network elements. It should also be appreciated that architecture within system 100 may be implemented in computer executable software (e.g., on a tangible, non-transitory computer-readable medium) located within one or more network elements. Module functionality of architecture within system 100 may be located on a single device or distributed across a plurality of devices including one or more centralized servers and one or more mobile units or end user devices. The architecture depicted in system 100 is meant to be exemplary and non-limiting. For example, while connections and relationships between the elements of system 100 are depicted, it should be appreciated that other connections and relationships are possible. The system 100 described below may be used to implement the various methods herein, by way of example. Various elements of the system 100 may be referenced in explaining the exemplary methods described herein.

Network 102, 104 may be a wireless network, a wired network or any combination of wireless network and wired network. Although Network 102, 104 is depicted as one network for simplicity, it should be appreciated that according to one or more embodiments, Network 102, 104 may comprise a plurality of interconnected networks, such as, for example, a service provider network, the Internet, a cellular network, corporate networks, or even home networks, or any of the types of networks mentioned above. Data may be transmitted and received via Network 102, 104 utilizing a standard networking protocol or a standard telecommunications protocol.

Figure 2:
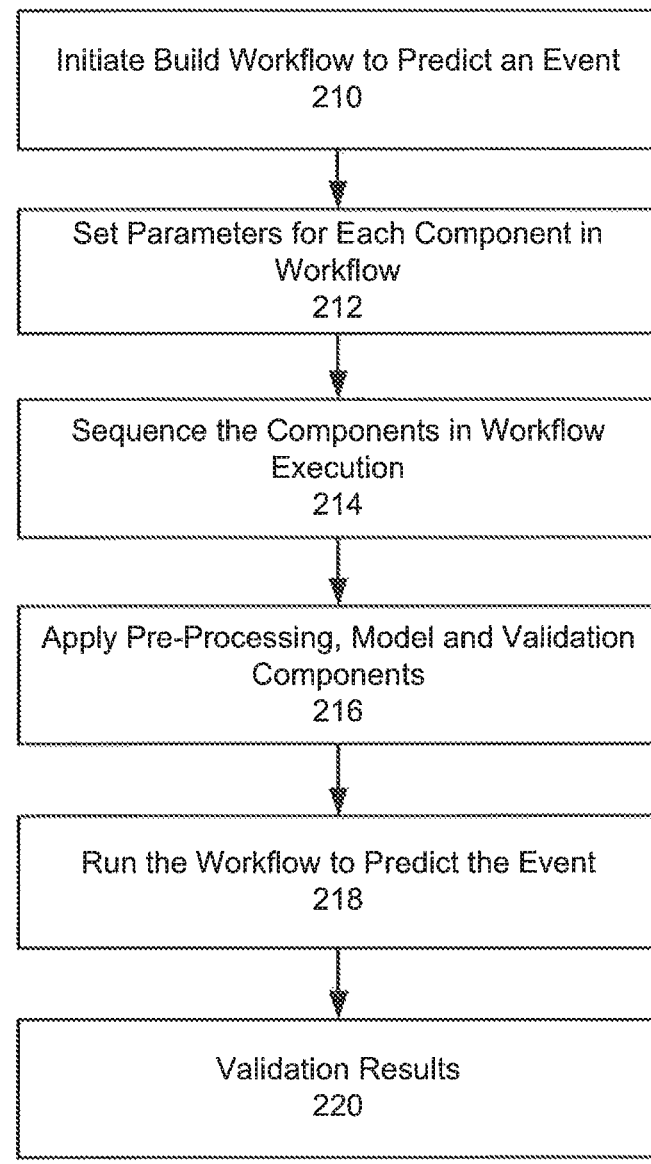
FIG. 2 illustrates an exemplary flow chart of a self-service machine learning framework, according to an embodiment of the present invention.

FIG. 2 illustrates an exemplary flow chart of a self-service machine learning framework, according to an embodiment of the present invention. At step 210, a build workflow to predict an event may be initiated. For example, the event may involve predicting risk bank loans. In this example, the dataset may contain information on loans obtained from a credit agency in a specific country. The credit dataset may include a thousand examples on loans, plus a set of numeric and nominal features indicating the characteristics of the loan and the loan applicant. At step 212, parameters may be set for each component in a workflow. At step 214, a sequence of the components in a workflow execution may be identified. At step 216, pre-processing, model and validation components may be applied. At step 218, the workflow may be run to predict the event. At step 220, validation results may be provided. While the process of FIG. 2 illustrates certain steps performed in a particular order, it should be understood that the embodiments of the present invention may be practiced by adding one or more steps to the processes, omitting steps within the processes and/or altering the order in which one or more steps are performed.

Figure 3:
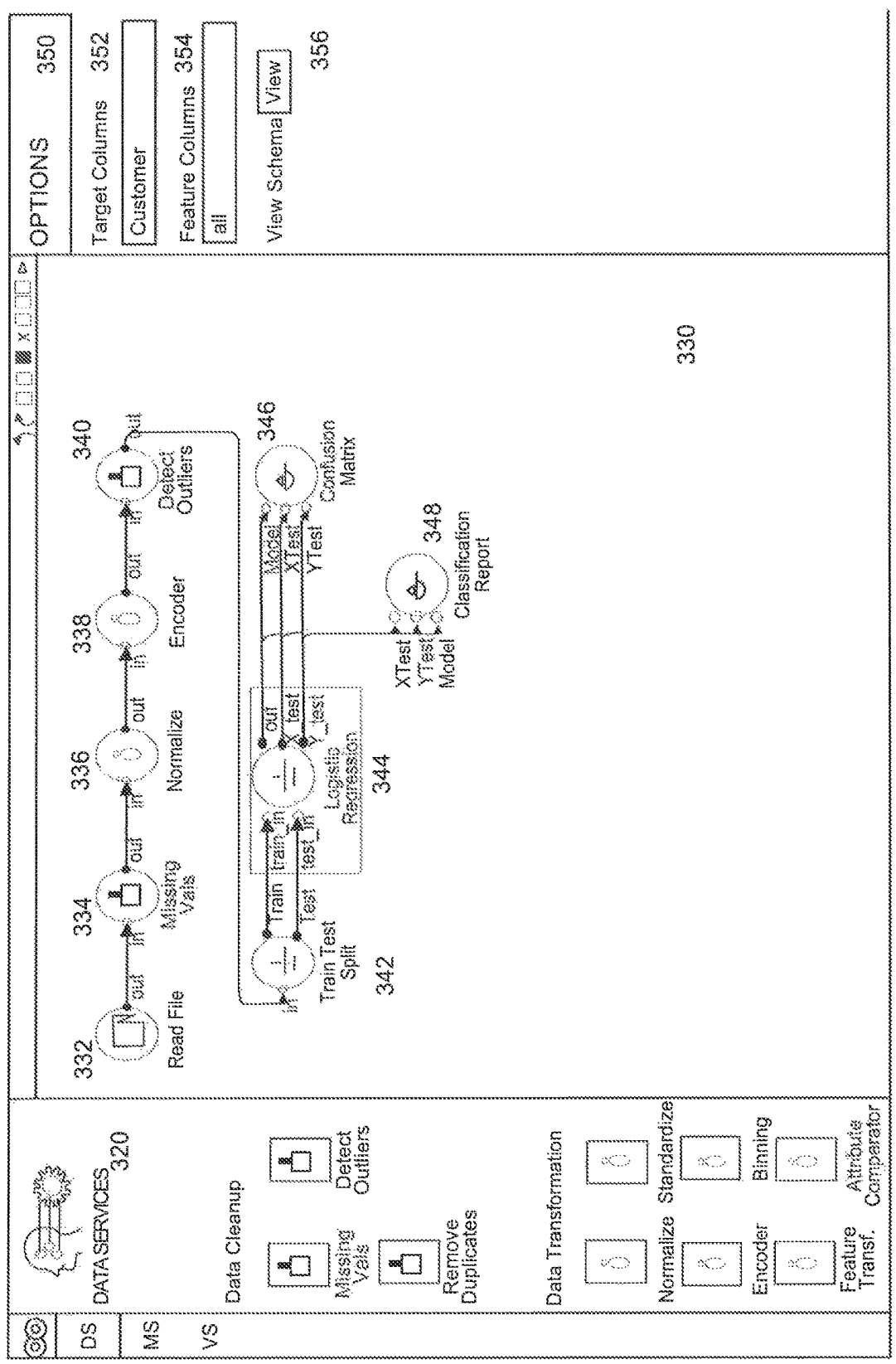
FIG. 3 is an exemplary interactive user interface, according to an embodiment of the present invention.

FIG. 3 is an exemplary interactive user interface, according to an embodiment of the present invention. As shown in FIG. 3, a user may select from Data Services (DS), Model Services (MS) and Validation Services (VS). FIG. 3 illustrates Data Services which may include Data Cleanup, Data Transformation and Feature Selection. Each component may represent one of the Statistical and Machine Learning techniques under respective services.

As shown in FIG. 3, Data Services 310 may be applied. Here, a File Handling component may be identified, such as Read File 332 which may involve identifying an input file, such as a data source or data file. Next, a Data Cleanup component may be identified, such as Missing Values 334. A user may be prompted to identify an imputation strategy (e.g., mean) and identify columns list (e.g., ColA, ColB, ColC). Next, Data Transformation components may be identified, such as Normalize 336 and Encoder 338. A user may be prompted to identify a column list for Normalize 336 and an encoding type for Encoder 338. Data Cleanup component, such as Outliers 340, may be applied. The components may then be sequenced by identifying output to input sequences between the components. For example, this may involve connecting an output of Read File 332 to an input of Missing Vals 334; connecting the output of Missing Vals 334 to the input of Normalize 336; connecting the output of Normalize to the input of Encoder 338; and connecting the output of Encoder 338 to the input of Detect Outlifers 340.

Next, Model Services 312 may be applied. As shown in FIG. 3, Data may be trained via Train Test Split 342. A logistic regression may be applied to the data at 344. An appropriate set of inputs and outputs may be automatically applied and identified. For example, for Train Test Split 342, an input and a Train output and Test output may be identified. For Logistic Regression 344, inputs train_in and test_in as well as outputs out, X_test output and Y_test output may be identified.

Finally, Validation Services 314 may be applied. In this example, Confusion Matrix may be applied at 346 and a Classification report may be generated at 348. Confusion Matrix may have inputs Model, XTest and YText. Likewise, Classification Report 348 may have inputs XTest, YTest and Model. The components may then be sequenced by identifying output to input sequences between the components. This may involve connecting Train and Test outputs of Train Test Split 342 to train_in and test_in inputs of Logistic Regression 344, respectively. The output of Logistic Regression 344 may be connected to Model input of Confusion Matrix 346 and to Model input of Classification Report 348. The X_test output of Logistic Regression 344 may be connected to XTest input of Confusion Matrix 346 and to XTest input of Classification Report 348. The Y_test output of Logistic Regression 344 may be connected to YTest input of Confusion Matrix 346 and to Ytest input of Classification Report 348.

Upon sequencing the output of Detect Outliers 340 to the input of Train Text Split 342, the system may identify a train size and random state. The system may then apply pre-processing, model and validation components. The system may then run the workflow and execute results, which may be shown as Execution Results, detailed in FIG. 4.

Options may be provided at 350 and may include Target columns 352 and Feature columns 354. Schema may be viewed at selecting 356.

Figure 4:
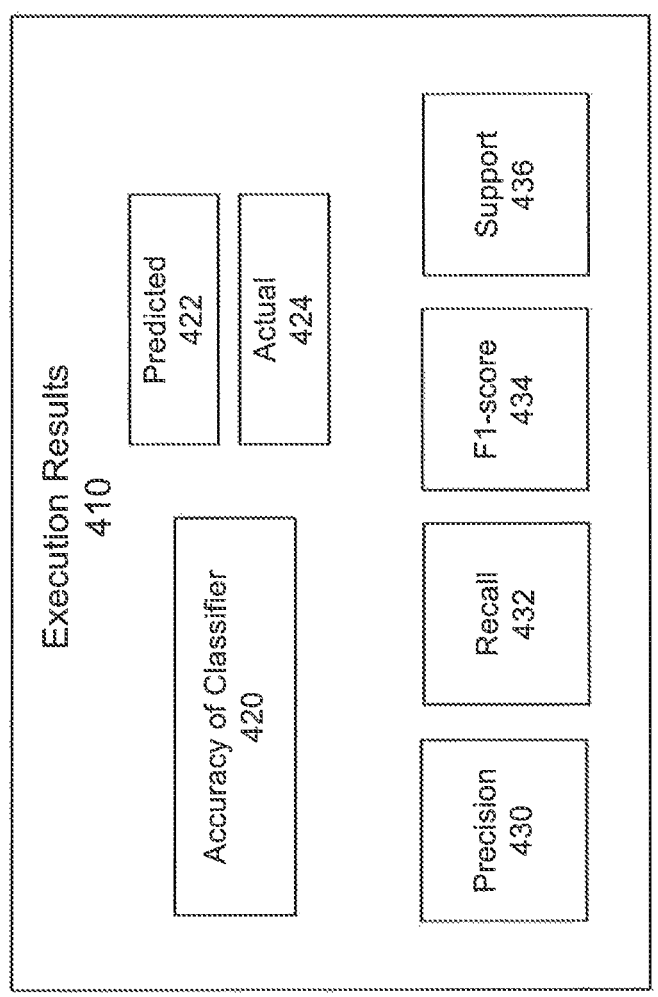
FIG. 4 is an exemplary interactive user interface, according to an embodiment of the present invention.

FIG. 4 is an exemplary interactive user interface, according to an embodiment of the present invention. FIG. 4 illustrates Execution Results 410 which may include Accuracy of Classifier 420. This may include accuracy of logistic regression classifier on a test set. Accuracy data may include Predicted 422 and Actual 424. Execution Results may also include Precision 430, Recall, 432 F1-score 434, Support 436 and may further include an average or total calculation. In statistical analysis of binary classification, the $F_1$ score (also F-score or F-measure) may represent a measure of test accuracy. This score may consider various factors, including precision p and recall r of the test to compute a score. Here, p may represent a number of correct positive results divided by a number of all positive results returned by the classifier, and r may represent a number of correct positive results divided by a number of all relevant samples (e.g., all samples that should have been identified as positive). The $F_1$ score may represent a harmonic average of the precision and recall, where an $F_1$ score reaches its best value at 1 (perfect precision and recall) and worst at 0.

The foregoing examples show the various embodiments of the invention in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

As described above, the various embodiments of the present invention support a number of communication devices and components, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner.

Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, JavaScript and/or Python. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

In the system and method of exemplary embodiments of the invention, a variety of "user interfaces" may be utilized to allow a user to interface with the mobile devices or other personal computing device. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A system that implements a machine learning accelerator tool, the system comprising:
   an input that receives a data file from a data source via a communication network; and
   a computer processor, coupled to the user interface and a memory, configured to perform the steps of:
   initiating a build workflow to predict an event, wherein the workflow comprises three phases of developing a machine learning solution, the three phases comprising a data services, a model services, and a validation services, and each of the three phases containing a plurality of components;
   wherein the data services components comprise a file handling component configured to identify the data file received from the data source, a data cleanup component configured to identify missing data and outlier data, and a data transformation component configured to prepare the data for use with the machine learning accelerator tool;
   wherein the model services components comprise a logistic regression component;
   wherein the validation services components comprise a confusion matrix component and a classification report component;
   setting one or more parameters for each component in the workflow;
   sequencing, via an interactive user interface, the components in the workflow, wherein the interactive user interface allows for user manipulation of the Data Services components, Model Services components and Validation Services components;
   executing the workflow to predict the event; and
   providing, via the interactive user interface, validation results.

2. The system of claim 1, wherein the Data Services component comprises:
   File Handling, Data Cleanup, Data Transformation and Feature Selection.

3. The system of claim 2, wherein the Data Cleanup comprises: identifying missing values, detecting outliers and removing duplicates.

4. The system of claim 2, wherein the Data Transformation comprises:
identifying outliers, missing values, perform aggregation, perform data functions, provide an option for new column creation, and utilize unstructured data.

5. The system of claim 1, wherein the Model Services component comprises: Model Building.

6. The system of claim 5, wherein the Model Building comprises: train test splits, logistic regression, regressors and classifiers.

7. The system of claim 1, wherein the Validation Services component comprises: Model Evaluation.

8. The system of claim 7, wherein the Model Evaluation comprises confusion matrix, classification report, and mean error.

9. The system of claim 1, wherein the computer processor is configured to perform the step of:
applying pre-processing, model and validation components.

10. The system of claim 1, wherein the validation results comprise accuracy data relative to predicted data and actual data.

11. A method that implements a machine learning accelerator tool, the method comprising the steps of:
receiving, via an input, a data file from a data source via a communication network;
initiating, via a computer processor, a build workflow to predict an event, wherein the workflow comprises three phases of developing a machine learning solution, the three phases comprising a data services, a model services, and a validation services, and each of the three phases containing a plurality of components;
wherein the data services components comprise a file handling component configured to identify the data file received from the data source, a data cleanup component configured to identify missing data and outlier data, and a data transformation component configured to prepare the data for use with the machine learning accelerator tool;
wherein the model services components comprise a logistic regression component;
wherein the validation services components comprise a confusion matrix component and a classification report component;
setting, via the computer processor, one or more parameters for each component in the workflow;
sequencing, is an interactive user interface, the components in the workflow, wherein the interactive user interface allows for user manipulation of the Data Services components, Model Services components and Validation Services components;
executing, via the computer processor, the workflow to predict the event; and
providing, via the interactive user interface, validation results.

12. The method of claim 11, wherein the Data Services component comprises: File Handling, Data Cleanup, Data Transformation and Feature Selection.

13. The method of claim 12, wherein the Data Cleanup comprises:
identifying missing values, detecting outliers and removing duplicates.

14. The method of claim 12, wherein the Data Transformation comprises:
identifying outliers, missing values, perform aggregation, perform data functions, provide an option for new column creation, and utilize unstructured data.

15. The method of claim 11, wherein the Model Services component comprises: Model Building.

16. The method of claim 15, wherein the Model Building comprises: train test splits, logistic regression, regressors and classifiers.

17. The method of claim 11, wherein the Validation Services component comprises: Model Evaluation.

18. The method of claim 17, wherein the Model Evaluation comprises confusion matrix, classification report, and mean error.

19. The method of claim 11, further comprising the step of:
applying pre-processing, model and validation components.

20. The method of claim 11, wherein the validation results comprise accuracy data relative to predicted data and actual data.

* * * * *